June 11, 1940. W. J. TAYLOR ET AL 2,204,519
APPARATUS FOR SIMULTANEOUSLY CUTTING A PLURALITY OF CONFECTIONERY PRODUCTS
Filed Oct. 8, 1938 4 Sheets-Sheet 1
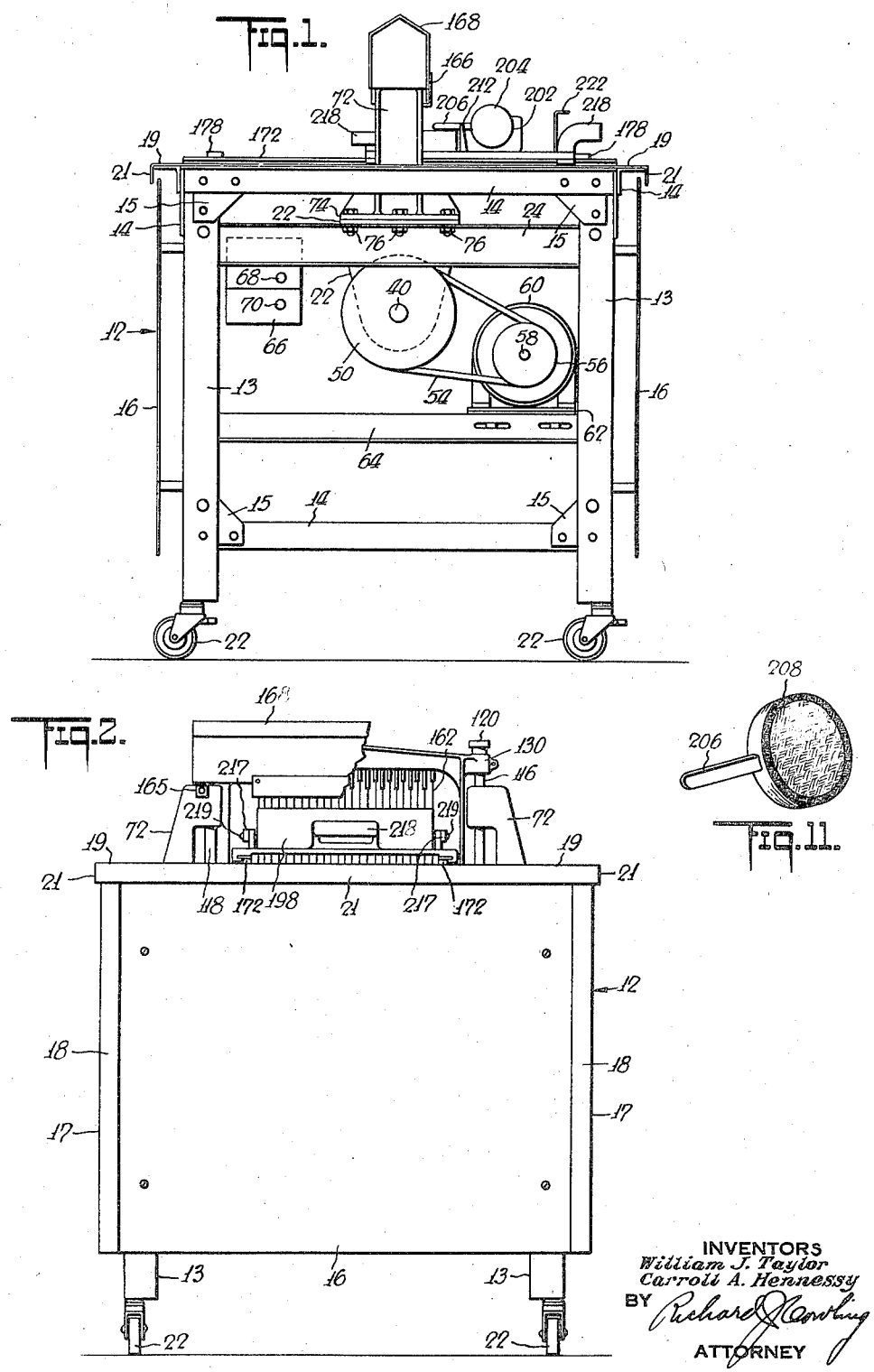
INVENTORS
William J. Taylor
Carroll A. Hennessy
BY Richard J. Cowling
ATTORNEY

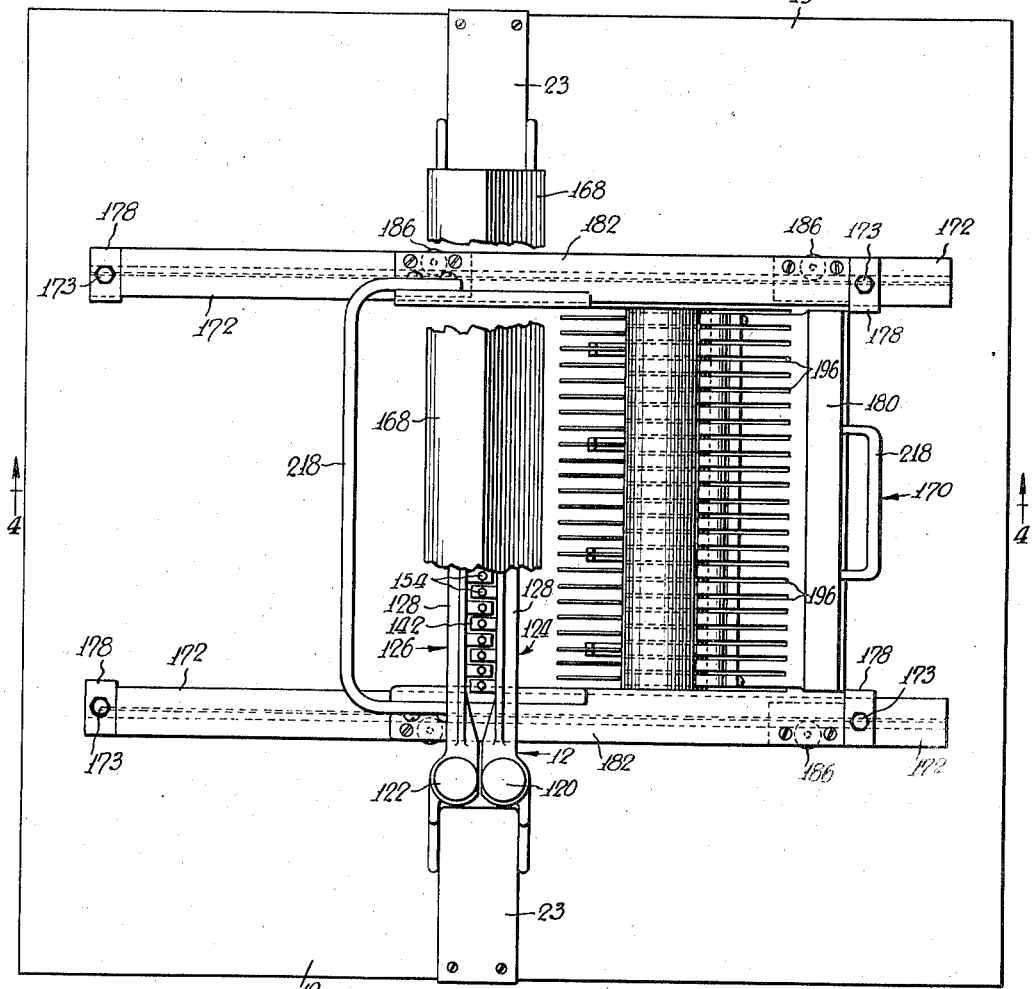
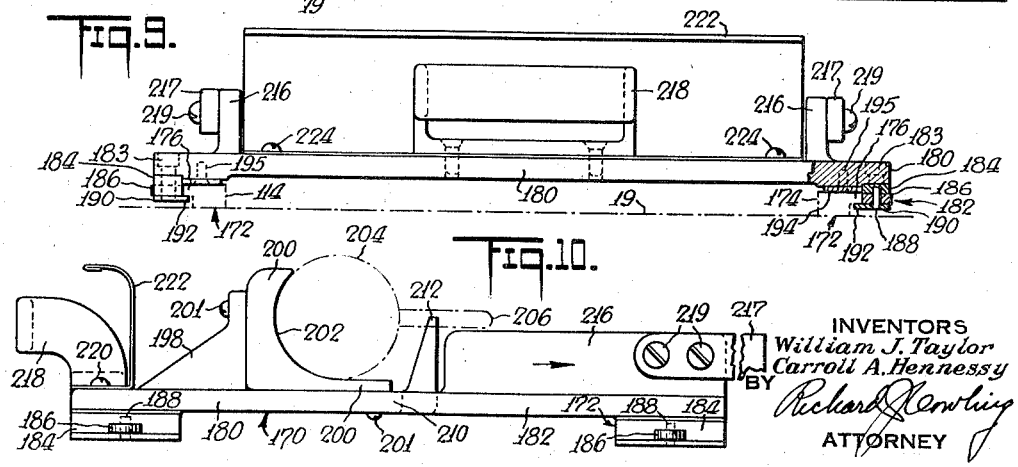

June 11, 1940.  W. J. TAYLOR ET AL  2,204,519
APPARATUS FOR SIMULTANEOUSLY CUTTING A PLURALITY OF CONFECTIONERY PRODUCTS
Filed Oct. 8, 1938  4 Sheets-Sheet 3
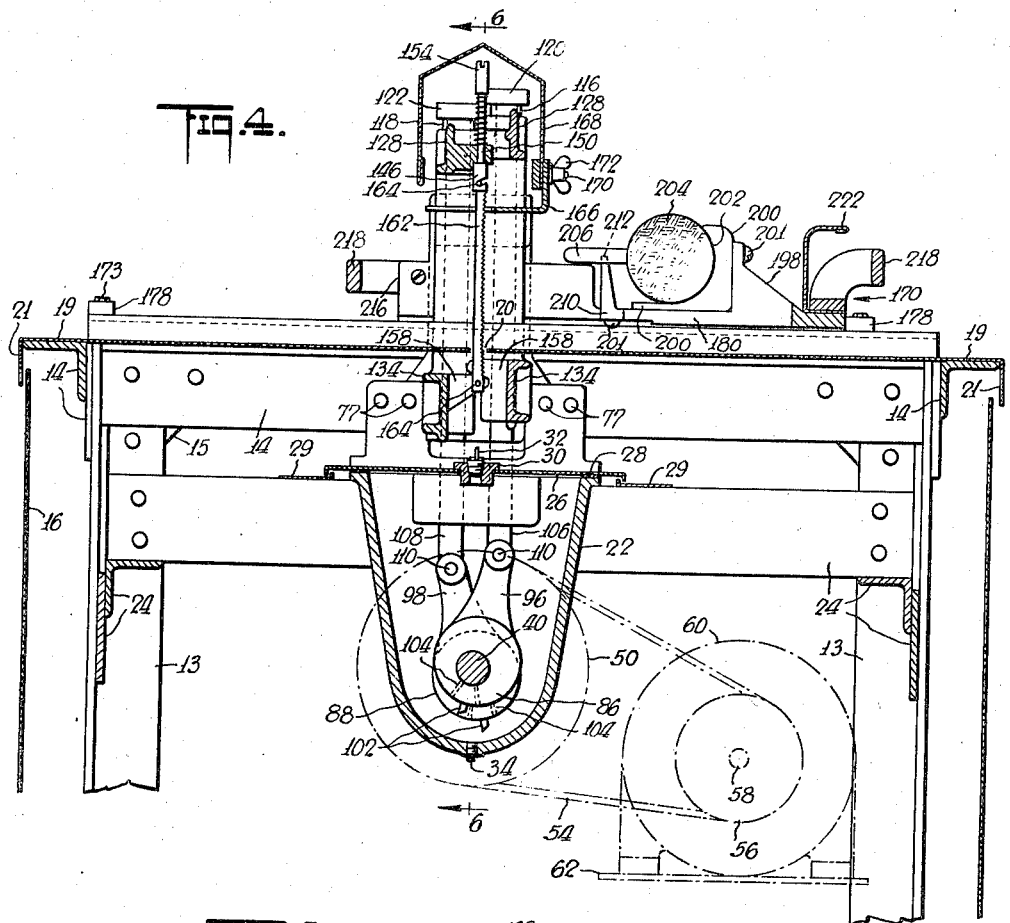
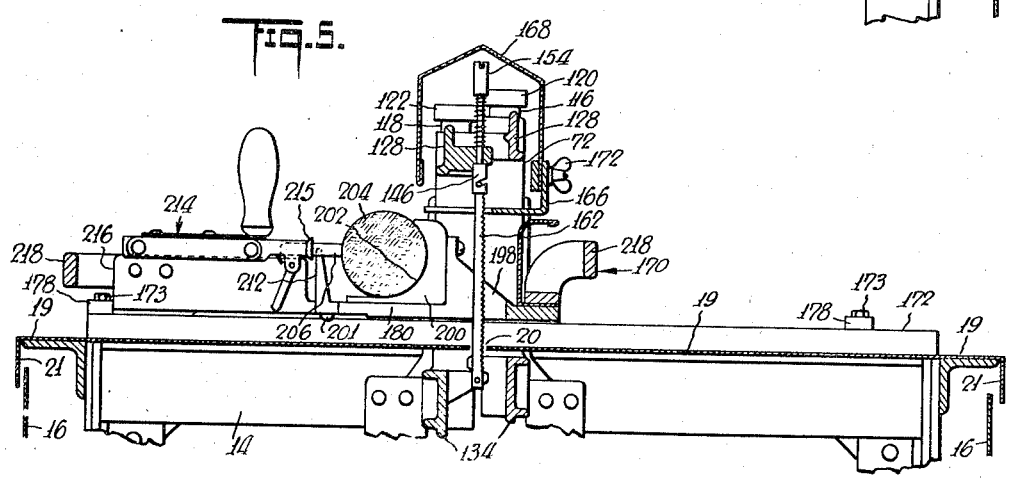
INVENTORS
William J. Taylor
Carroll A. Hennessy
BY
Richard J. Howling
ATTORNEY

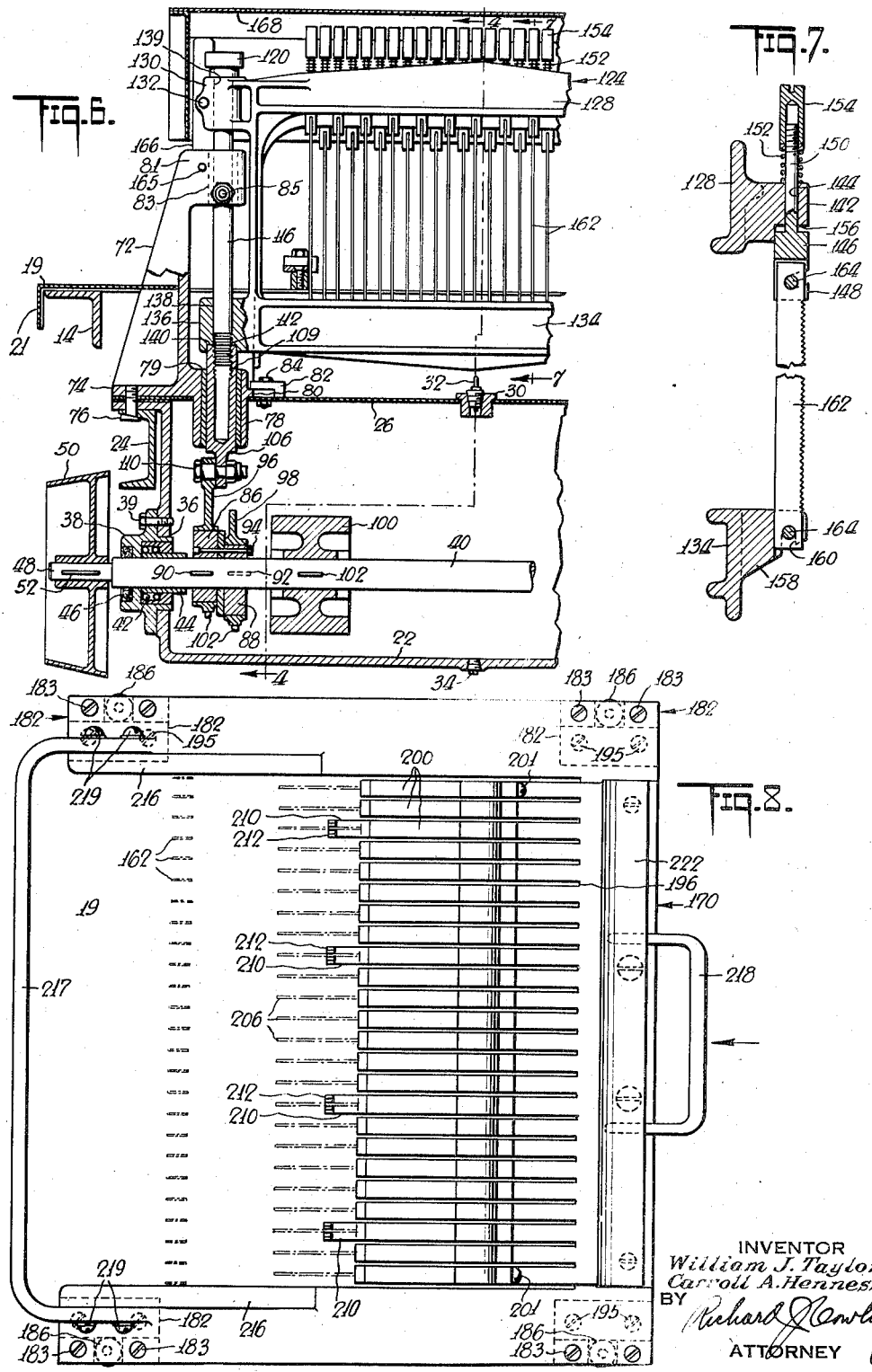

Patented June 11, 1940

2,204,519

UNITED STATES PATENT OFFICE 2,204,519

APPARATUS FOR SIMULTANEOUSLY CUTTING A PLURALITY OF CONFECTIONERY PRODUCTS

William J. Taylor and Carroll A. Hennessy, Syracuse, N. Y., assignors to Joe Lowe Corporation, New York, N. Y., a corporation of Delaware Application October 8, 1938, Serial No. 233,956

10 Claims. (Cl. 107—21)

The present invention relates generally to improvements in cutting machines, and it has particular relation to a machine of the type in which large blocks of frozen ice cream, ice milk, sherbet, water-ice, frozen custard and the like, may be cut simultaneously into a plurality of frozen confectionery products in a most efficient, economical and sanitary manner.

The invention, in the specific embodiments illustrated in the accompanying drawings, relates more particularly to the cutting of cylindrically shaped blocks or frozen material, having a plurality of longitudinally spaced handle members projecting therefrom, into a plurality of individual confectionery products, each being provided with one of said handle members.

In the specific embodiments illustrated, the apparatus, which is constructed as a portable unit, consists of a frame structure having a slotted table top over which is mounted a suitable slicing or cutting mechanism. The cutting mechanism consists essentially of two oppositely mounted reciprocating knife or saw frames carrying a plurality of alternately spaced reciprocating cutting knives or saws, having their cutting edges arranged substantially in a single transverse vertical plane. The saw carrying frames are suitably reciprocated through connecting rods, link members, eccentric rods and eccentrics, which latter members are suitably connected to a single drive shaft that is driven by an electrically operated motor. A pair of tracks are mounted longitudinally of the slotted table top and through the knife or saw carrying frames for slidably receiving a movable carriage member. The carriage member is provided with a slotted cradle-like supporting structure having a recess for receiving a block of frozen material to be cut or severed. The slotted supporting structure is adapted to be passed between and through the cutting knives or saws, and the cylindrically shaped block of frozen material positioned thereon, having a plurality of longitudinally spaced handle members projecting outwardly therefrom, is thereupon severed or cut into a plurality of individual pieces each containing a handle member. As the carriage member is moved along the tracks and the slotted supporting structure containing the block of frozen material to be cut is passed between and through the cutting saws, the projecting ends of the handle members are releasably secured in a portable carrier which has been manually positioned upon suitable guide supporting rails mounted adjacent the opposite end of the carriage member. The portable carrier permits removal of all of the completely severed and now individual confectionery products simultaneously by means of their projecting handle members to any other part of the plant for coating, such as by dipping, wrapping, etc. as a single unit. It will be apparent from the foregoing brief description that a plurality of individual confectionery products can be simultaneously formed from a large block of frozen material in a most efficient, economical and sanitary manner.

An object of the invention is to provide a simple and inexpensive cutting machine, having a multiple cutting mechanism, which will simultaneously sever a single large block of frozen material, of any desired shape, containing a plurality of longitudinally spaced handle members, into a plurality of individual frozen confectionery products each containing a handle member, without binding or sticking.

Another object of the invention is the provision of a cutting machine of the character described which is adapted to cut or sever a large single bock of frozen material, having no outside wrapper or other protective covering, into a plurality of individual confectionery products of equal size and shape without crunching, chipping or breaking the frozen substance, thereby damaging the severed confection.

A further object of the invention is to provide a simple and inexpensive cutting machine of the character described with a movable carriage mechanism, having a slotted supporting structure of cradle-like shape for receiving a large block of material, which cradle-like structure is so designed and constructed as to pass between and through the cutting knives or saws while holding the material to be cut during the actual cutting or severing operation.

Another object of the invention is the provision of a cutting mechanism of the character described, having a movable carriage for holding the material to be cut, which carriage has a slotted cradle-like supporting structure that is adapted to pass between and through the cutting saws while holding the material during the actual cutting or severing operation, said cradle-like supporting structure having means for holding the projecting handle members in a predetermined position so that they may be delivered in a single plane to a portable gripping and carrying apparatus.

A further object of the invention is to provide a cutting mechanism of the character described, which is provided with a movable carriage having a cradle-like supporting structure for holding a large block of material to be cut containing a plurality of spaced handle members projecting therefrom in a predetermined position with said handle members supported in a predetermined plane, which carriage mechanism is adapted to be passed by movement of the carriage mechanism through and beyond the cutting saws, means are provided on the opposite end of the carriage mechanism for positioning and slidably moving a portable carrier member in said predetermined plane of said handle members for simultaneously receiving and securing said handle members into the receiving mechanism of said carrier member.

Other and further objects and advantages of the invention reside in the detailed construction of the apparatus, which result in simplicity, economy and efficiency, and which will be apparent from the following description, wherein a preferred form of embodiment of the invention is shown, reference being had to the accompanying drawings, forming a part thereof, in which:

Fig. 1 is a side elevational view of a machine constructed in accordance with the invention, the same having its side cover plate removed for the sake of clearness;

Fig. 2 is a front elevational view of the apparatus shown in Fig. 1;

Fig. 3 is a top plan view, with parts being broken away for the sake of clearness, of the machine shown in Fig. 1;

Fig. 4 is a sectional view of the apparatus shown in Fig. 3, the same being taken substantially along the line 4—4 thereof;

Fig. 5 is a sectional view of the movable carriage mechanism, the same being taken substantially along the line 4—4 of Fig. 3, and illustrating the removal of the completely severed confectionery products therefrom by means of a portable carrier member:

Fig. 6 is a sectional view of the driving and cutting mechanism, having portions thereof broken away for the sake of clearness, the same being taken substantially along the line 6—6 of Fig. 4;

Fig. 7 is a longitudinal sectional view taken along the line 7—7 of Fig. 6, the same illustrating the mounting of the individual knives or saw blades on the frame structure of the machine;

Fig. 8 is a top plan view of the movable carriage mechanism, illustrating the respective positions of the knives or saw blades and handle members in dot and dash lines;

Fig. 9 is an end view of the movable carriage mechanism;

Fig. 10 is a side view of the movable carriage mechanism shown in Fig. 9; and

Fig. 11 is a perspective view of one type of frozen confectionery product which is provided with a handle member that can be cut from a single cylindrically shaped block of composite frozen material with the apparatus.

Referring now to the drawings, wherein like numerals indicate like parts, there is shown a box-like supporting frame structure 12, consisting of vertical uprights or standards 13, which are suitably connected and braced by horizontal members 14 and reinforced at the corners with angular plates 15. The supporting structure 12 is suitably enclosed by end plates 16 and side plates 17, the side plates 17 having their vertical edges turned inwardly to form a covering strip 18 for the vertical edges of the side plates 17. The top of the supporting structure 12 is covered with a pair of spaced bed plates 19, providing a transverse opening or slot 20 centrally thereof. The lateral edges of the plates 19 are turned down to form a covering strip 21 for the top edges of the end plates 16 and side plates 17. Small cover plates 23 are mounted over that portion of the slot 20 beyond the cutting mechanism. In this manner the operating mechanism, which is entirely enclosed within the supporting structure 12, is kept free from dirt, dust, dripping of confectionery material, etc. at all times. The lower ends of the standards 13 are provided with casters 22, which make the supporting structure 12 readily movable from place to place.

Mounted transversely of the supporting frame structure 12 is a crank case 22, which is suspended from suitable angle iron brace rods 24 secured to the supporting structure 12 on the standards 13. The crank case 22 has a top cover plate 26 suitably secured thereto. A gasket 28 is positioned between the crank case 22 and the cover plate 26, and an angular overlapping plate 29 is mounted, as best shown in Fig. 4, transversely of the frame structure between the brace members 24 and the cover plate 26, thereby sealing the top of the crank case 22 against dust, dirt and drippings from the confectionery material, as well as preventing leakage of oil from splashing, etc. The top of the cover plate 26 is provided with an inlet plug 30, through which oil may be inserted into the crank case 22, and, inasmuch as the crank case housing 22 is substantially air-tight, the inlet plug 30 is provided with an atmospheric air discharge vent 32 to relieve any compression which might be created therein by movement of the driving mechanism. A suitable outlet plug 34 is provided in the bottom of the crank case housing 22 for draining the oil therefrom.

The crank case housing 22 has apertures 36 extending through its sidewall at opposite ends thereof into which are mounted flanged bearing members 38 secured by bolts 39. A crank shaft 40 is journaled in the bearing members 38 for operating the cutting mechanism hereinafter to be described. Each of the bearing members 38 consists of a double row of self-aligning radial ball bearings 42, which are provided with an extended inner bearing race 44 suitably secured to the shaft 40 by means of headless set screws. The opposite or outer sides of the bearing members 38 are provided with "Garlock" closures or suitable packing rings 46, which prevent leakage of oil along the crank shaft 40 from the bearing members 38.

The crank shaft 40 has a reduced stub shaft 48 adjacent one end thereof, which has a driving pulley wheel 50 keyed thereto by means of a key 52. A belt 54 connects the pulley wheel 50 to a driving wheel 56, which in turn is mounted on a drive shaft 58 of a motor 60. The motor 60 is supported by a platform 62 fastened to angle iron supporting members 64 secured intermediate the ends of the standards 13. The motor 60 is operated through a suitable starting box 66, containing a conventional starting switch 68 and a stopping switch 70.

Vertical guide frame members 72 of bifurcated form, having horizontal base flanges 74, are mounted through the table top 19 adjacent the opposite sides of the frame structure 12 and centrally of the slot 20 extending transversely of the top 19. The frame members 72 have their base flanges 74 mounted on top of the cover plate 26 of the crank case 22 and the brace rods 24 to which they are suitably secured by bolts 76.

Bolts 77 also secure the guide frames 72 to the horizontal brace rods 14. The inner sides of the lower ends of each of the frame members 72 are provided with a pair of vertical bearing members 78, which are formed integrally therewith. The bearing members 78 contain bearings 79 extending downwardly through the cover plate 26 and into the crank case 22 adjacent each end thereof. The inner sides of the bearing members 78 are provided with short horizontal flanges 80 which are in turn secured to the top cover plate 26 of the crank case 22 by means of L-shaped brackets 82 and clamping bolts 84. The integrally formed upper ends 81 of the guide frame members 72 project inwardly, providing a pair of vertical bearing members 83, having a suitable grease fitting 85. The bearing members 79 and 83 are mounted in vertical alignment on each side of the machine, and are adapted to receive and guide vertically extending connecting rods as will be hereinafter more fully described.

The crank shaft 40 is provided with two spaced pairs of eccentrics or cranks 86 and 88, which are suitably keyed thereto by means of the keys 90 and 92, respectively. The eccentrics 86 and 88 are mounted at one hundred and eighty degrees from one another on the shaft 40, and are thereby caused to impart an alternating and reciprocating motion of about one-half inch in length to their respective eccentric rods 96 and 98. A balance or fly wheel 100 is provided for each pair of eccentrics 86 and 88. The fly wheels 100 are keyed to the shaft 40 by means of the keys 102 a short distance inwardly from their respective pairs of eccentrics 86 and 88. While only one side of the drive shaft 40 is shown in the drawings in detail, it is to be understood that the opposite side thereof is constructed identical to the side shown and described hereinabove. The bottoms of the eccentrics 86 and 88 are provided with suitable paddles 102, which serve to splash oil up and into the oil holes 104 for lubrication purposes when the oil level in the crank case 22 has dropped below the oil holes 104.

The opposite ends of the eccentric rods 96 and 98 are respectively pivotally connected, as indicated at 110, to hollow connecting link members 106 and 108. The link members 106 and 108 are internally threaded at their upper ends, as indicated at 109, and are adapted to receive and engage the lower threaded ends of the connecting rods 116 and 118, respectively, as indicated at 112. The connecting rods 116 and 118 are vertically slidable in the bearings 79 and 83 of the guide frame members 72. The upper ends of the connecting rods 116 and 118 are threaded to receive bosses 120 and 122, respectively, which are easily removable for the purpose of assembling or removing the saw frame mechanism from the connecting rods.

The saw mechanism, which is best shown in Figs. 5, 6 and 7, consists of a pair of spaced reciprocating saw frames 124 and 126 of substantially rectangular shape, having integrally formed upper cross-bars 128 provided with outwardly projecting hollow clamping collars 130 and a clamping bolt 132. The integrally formed lower cross-bars 134 have outwardly extending lugs 136, which are provided with a vertical aperture 138. The opening 139 in the clamping collars 130 and the apertures 138 in the lugs 136 are in vertical alignment on each side of the machine, and such vertically aligned openings are adapted to receive and engage the connecting rods 116 and 118. The saw frames 124 and 126 are mounted transversely of the frame structure 12 on the connecting rods 116 and 118, respectively, with their upper cross-bars 128 positioned above the table top 19 and with their lower cross-bars 134 positioned below the table top 19 and above the crank case cover 26. When the saw frames 124 and 126 are slidably positioned over their respective connecting rods 116 and 118, the bottom sides of the lower lugs 136, which are recessed, as indicated at 140, receive and engage the tops of the connecting link members 106 and 108, as best shown in Fig. 6, which act as supports for the saw or knife frame structures 120 and 122. By turning the connecting rod 116 by means of its boss 120 and the connecting rod 118 by means of its boss 122, their respective connecting link members 106, which are thereupon further threaded onto their respective connecting rods 116 and 118, are pulled up tightly against the bottom surfaces of the lower lugs 136, thereby causing the saw frames 124 and 126 to be brought up tightly against their bosses 120 and 122 and the frames 124 and 126 are wedged between the tops of said connecting link members 106 and 108 and the bosses 120 and 120, respectively, forming a rigid connection therebetween. The clamping collars 130 may now be tightened on the connecting rods 116 and 118 by means of the clamping bolts 132. To remove the saw frames 124 and 126 from their respective connecting rods 116 and 118 for cleaning and repairing, it is merely necessary to unscrew their respective bosses 120 and 122 and slide said frames upwardly over the unobstructed ends of the connecting rods.

As best shown in Fig. 7, each of the saw or knife frames 124 and 126 have their upper cross-bars 128 provided with a series of longitudinally spaced and inwardly projecting lugs 142. The lugs 142 of the cross-bar 128 of the saw frame 124 are alternately positioned thereon with respect to the lugs 142 of the cross-bar 128 of the saw frame 126. In this manner the lugs 142 of the respective cross-bars are staggered with respect to one another and mesh along a common center line transversely of the machine and in vertical alignment with the slot 20 in the table top 19. Each of the holes 144 of the lugs 142 is adapted to receive adjustable saw or knife hook 146, comprising a yoked shaped hook member 148, a guide pin 150, a spring tensioning member 152 and an adjusting nut 154. A recess 156 in the bottom of the lug 142 guides and prevents the hook member 148 from turning on its guide pin 150. The lower cross-bars 134 are provided with fixed saw or knife hooks 158, which are spaced and positioned transversely of the machine 12 in the same manner as the lugs 142 of the upper cross-bars 128. The lugs 142 and the saw or knife hooks 158 are therefore in vertical alignment on their respective saw or knife frames. Each of the saw hooks 158 is provided with a slot or recess 160 in the lower side thereof. Saw or knife blades 162, which are provided with laterally projecting pins 164 integrally formed adjacent each end thereof, are adapted to be mounted between the yoked shaped hooks 148 on the upper cross-bars 128 and the fixed saw hooks 158 of the lower cross-bar 134 of the same saw frame member by means of the projecting saw or knife pins 164.

Mounted on the upper ends 81 of the guide members 72 by means of a bolt 165 is an angle iron bracket 166 upon which is fastened a hood or cover member 168 by means of a bolt 170 and wing nut 172. This cover member 168 protects the operator from coming into contact with the reciprocating saw or knife frames 124 and 126 when the machine is in operation.

Associated with the saw cutting mechanism is a movable carriage member 170, which is adapted to be moved longitudinally of the machine on tracks 172 and pass between and through the reciprocating saws or knife blades 162, which has a cradle supporting structure for holding a block of material to be cut. The tracks 172 are secured by bolts 173 to the table top 19 intermediate the sides thereof. As best shown in Fig. 9, the tracks 172 are of an L-shaped construction, having their short arms 174 mounted along the table top 19 and their long arms 176 spaced therefrom and projecting outwardly towards the sides 17 of the frame structure 12. Stops 178 are provided adjacent the ends of the tracks 172 to limit the movement of the carriage member 170 thereover.

The movable carriage member 170 comprises a U-shaped base plate 180, having longitudinally extending legs 182. The base plate 180 is provided adjacent the underside of each corner with roller members 182 secured thereto by means of screws 183. The roller members 182 facilitate movement of the carriage member 170 over the tracks 172. Each of the roller members 182 consists of a block 184, having a recess intermediate its ends and sides to horizontally receive a wheel 186, which is journaled on a pin 188. The pin 188 also serves to secure a locking plate 190, having an inwardly projecting flange 192, to the base of the roller member 182. The flange 192 of the roller member 182 engages the arm 176 of the track 172 and prevents removal of the carriage member 170 therefrom. A wearing plate 194 is secured to the underside of the base plate 180 by means of screws 195 for slidably engaging the top of the arm 176 of the track 172, thereby preventing excessive wear on the base plate 180 at this point.

The base plate 180 of the carriage member 170 is provided with a plurality of slots 196 suitable to receive and permit the saw or knife blades 162 to pass therethrough and operate therein, and the base plate 180 is also provided adjacent its front end with a vertically extending integrally formed end plate 198, which is substantially triangular in shape in its vertical cross-section. Mounted on the base plate 180 adjacent the rear side of the end plate 198 and spaced thereon transversely of the machine are a plurality of individual fingers 200, which are secured thereto by screws 201 and which have their rear side recessed, as indicated at 202, to provide a semicircular cradle-like supporting structure that is adapted to support a cylindrically shaped roll of confectionery material 204, having a plurality of longitudinally spaced handle members projecting therefrom along a common radial plane. The confectionery material 204 is to be cut simultaneously into a plurality of individual confectionery products 208, each being provided with a single handle member 206. It is to be understood that the shape of the fingers 200, which form the cradle-like structure, may be varied in any desired manner to conform to the shape of the block of material to be cut on the machine. Certain of the fingers 200 extend beyond the others, as indicated at 210, and are provided with upwardly projecting lugs 212, which are adapted to provide means for supporting certain of the radially protruding handle members 206 of the block of material 204, thereby retaining such handle members 206 in a predetermined horizontal plane for delivery to a portable carrier member 214 of conventional construction, having handle receiving and engaging funnels 215. The portable carrier 214 is manually positioned on the elevated guide rails 216 secured to the opposite end of the movable carriage member 170 on the extending legs 182 with its receiving funnels 215 facing the cutting knives or saw blades 162. The portable carrier is adapted to be slidably moved across the elevated guide rails 216 into engagement with the projecting ends of the handle members 206 projecting through the cutting mechanism. The front end of the carriage member 170 is provided with a pusher handle member 218 secured thereto by suitable bolts 220. The back end of the carriage member 170 is also provided with a handle member 217 secured to the elevated guide rails 216 by means of bolts 219.

In the operation of the apparatus, the starting switch 68 and stopping switch 70 control the motor 60, which through the belt 54 and pulley wheel 50 drives the shaft 40, thereby imparting through the eccentrics 86 and 88, connecting link members 96 and 98, and connecting rods 106 and 108 a reciprocatory movement to their respective saw frames 124 and 126, which in turn cause their respective saw or knife blades 162 to alternately reciprocate. In the construction shown, the alternate saws or knives 162 move in opposite directions to each other, thereby preventing the material 204 being cut from being pulled out of the recess 202 of its supporting cradle 200 by the frictional engagement of the moving knives.

The carriage mechanism 170 with its cradle-like supporting structure 200 is now positioned against the forward end of the machine 12 on the tracks 172, and is in position to receive the block of material 204 to be cut. The material 204 is manually inserted in the recess 202, which is of a substantially similar contour to the block 204, with the projecting handle members 206 pointing rearwardly toward the cutting mechanism. Certain of the handle members 206 are positioned on the spaced upstanding lugs 212, which serve to maintain the entire row of protruding handle members 206 in a predetermined horizontal plane for delivery to the receiving funnels 215 of the portable carrier 214 which is positioned on the opposite end of the carriage mechanism upon the elevated guide rails 216. The carriage mechanism 170 is now ready to be manually pushed rearwardly by means of the pusher handle 218, the handle sticks 206 passing between adjacent knives or saw blades 162, which now begin actually to sever the material 204 as it is moved therethrough against the moving blades 162. After the protruding ends of the handle members 206 have been moved through and beyond the knives 162, the portable carrier member 214, which has been mounted horizontally on the guide rails 216, is moved forwardly until its receiving funnels 215 facing the knives 162 receive and engage the projecting ends of said handle members 206, which are in the same horizontal plane as the receiving funnels 215. When the cradle-like supporting structure 202 of the carriage member 170 has been moved entirely through the knives or saws 162, the block of frozen material 204 is completely severed into a plurality of individual confectionery products 208, each of which is now provided with a separate handle member 206. The separate handle members 206 of the individual confections 208 are secured in the receiving funnels 215 of the portable carrier 214, and may be simultaneously carried, coated, etc., as though they were still a single unit. Obviously, the entire severing operation is accomplished without bringing the hands of the operator, or operators, into direct contact with the edible portion of the confectionery products 208, thereby insuring an efficient and highly sanitary cutting and manipulating operation.

Although we have only described in detail one form which the invention may assume, it will be apparent to those skilled in the art that the invention is not so limited, but that various modifications may be made therein without departing from the spirit thereof or from the scope of the appended claims.

What we claim is:

1. Apparatus of the class described comprising a supporting structure having a slotted table mounted thereon, reciprocating knife carrying frames carrying a plurality of alternately spaced reciprocating cutting knives which operate through the slot in said table, means for reciprocating said knife carrying frames, and, in combination therewith, a movable carriage member having a material supporting structure that is adapted to be passed between and through said cutting knives, said supporting structure having means for receiving a block of material containing a plurality of longitudinally spaced and outwardly projecting handle members protruding therefrom which is to be cut simultaneously into a plurality of individual pieces each containing a handle member when the same is passed between said knives, and means for maintaining said projecting handle members spaced from the top of said slotted table.

2. Apparatus of the class described comprising a supporting structure having a slotted table mounted thereon, reciprocating knife carrying frames carrying a plurality of alternately spaced reciprocating cutting knives which operate through the slot in said table, means for reciprocating said knife carrying frames, and, in combination therewith, a movable carriage member having a slotted supporting structure that is adapted to be passed between and through said cutting knives, said slotted structure having a plurality of transversely spaced upwardly extending curved fingers forming a cradle-like recess for receiving a block of material containing a plurality of longitudinally spaced and outwardly projecting handle members protruding therefrom which is to be cut simultaneously into a plurality of individual pieces each containing a handle member when the same is passed between and through said knives.

3. Apparatus of the class described comprising a supporting structure having a slotted table mounted thereon, reciprocating knife carrying frames carrying a plurality of alternately spaced reciprocating cutting knives which operate through the slot in said table, means for reciprocating said knife carrying frames, and, in combination therewith, a movable carriage member having a cradle-like supporting structure consisting of a plurality of transversely spaced longitudinally and upwardly extending curved fingers which are adapted to pass between and through said cutting knives, said cradle-like structure having a recess for receiving a block of material containing a plurality of longitudinally spaced and outwardly projecting handle members which is to be cut simultaneously into a plurality of individual pieces each containing a handle member when the block is passed through said cutting knives.

4. Apparatus of the class described comprising a supporting structure having a slotted table mounted thereon, reciprocating knife carrying frames carrying a plurality of alternately spaced receprocating cutting knives which operate through the slot in said table, means for reciprocating said knife carrying frames, and, in combination therewith, a movable carriage member having a supporting structure that is adapted to be passed between and through said cutting knives, said supporting structure having a recess for receiving a block of material containing a plurality of longitudinally spaced and outwardly projecting handle members protruding therefrom in a single plane which is to be cut simultaneously into a plurality of individual pieces each containing a handle member when the same is passed between said knives, said carriage having means spaced forwardly of said recess for maintaining said handle members in a predetermined position while the material is being cut and passed between said cutting knives.

5. Apparatus of the class described comprising a supporting structure having a slotted table mounted thereon, reciprocating knife carrying frames carrying a plurality of alternately spaced reciprocating cutting knives which operate through the slot in said table, means for reciprocating said knife carrying frames, and, in combination therewith, a movable carriage member having a cradle-like supporting structure consisting of a plurality of transversely spaced longitudinally extending fingers which are curved upwardly and which are adapted to pass between and through said cutting knives, said cradle-like structure having a recess for receiving a block of material containing a plurality of longitudinally spaced and outwardly projecting handle members protruding therefrom in a single plane which is to be cut simultaneously into a plurality of individual pieces each containing a handle member when the block is passed through said cutting knives, and means projecting beyond said fingers for supporting said handle members in a predetermined plane while the material is being cut.

6. Apparatus of the class described comprising a supporting structure having a slotted table mounted thereon, reciprocating knife carrying frames carrying a plurality of alternately spaced reciprocating cutting knives which operate through the slot in said table, means for reciprocating said knife carrying frames, and, in combination therewith, a movable carriage member having a supporting structure that is adapted to be passed between and through said cutting knives, said supporting structure having means for receiving a block of material containing a plurality of longitudinally spaced and outwardly projecting handle members in a single plane which is to be cut simultaneously into a plurality of individual pieces each containing a handle member when the same is passed between and through said cutting knives, said supporting structure having means associated therewith for maintaining said handle members in a predetermined plane during the cutting operation, said carriage member having means spaced from said supporting structure for receiving and supporting a portable carrier in the same predetermined plane as the handle members for receiving and engaging the projecting ends thereof as they are passed through the cutting knives.

7. Apparatus of the class described comprising a supporting structure having a slotted table mounted thereon, reciprocating knife carrying frames carrying a plurality of alternately spaced reciprocating cutting knives which operate through the slot in said table, means for reciprocating said knife carrying frames, and, in combination therewith, a movable carriage member having a supporting structure that is adapted to be passed between and through said cutting knives, said supporting structure having means for receiving a block of material containing a plurality of longitudinally spaced and outwardly projecting handle members arranged in a single plane which is to be cut simultaneously into a plurality of individual pieces each containing a handle member when the same is passed between and through said cutting knives, said supporting structure having elevated supporting means associated therewith for maintaining said handle members in a predetermined horizontal plane spaced from the table of the supporting structure during the cutting operation, said carriage member having second elevated track supporting means spaced from said material supporting structure for receiving and slidably supporting a portable carrier in the same horizontal plane as the handle member whereby the carrier may be slidably moved toward said cutting mechanism for receiving and engaging the projecting ends of the handle members as they are passed therethrough.

8. Apparatus of the class described comprising a supporting structure having a slotted table mounted thereon, reciprocating knife carrying frames carrying a plurality of alternately spaced reciprocating cutting knives which operate through the slot in said table, means for reciprocating said knife carrying frames, and, in combination therewith, spaced tracks mounted on said slotted table and extending through said knife carrying frames having a carriage member movable thereover, means mounted on said carriage member for maintaining a plurality of handle members in spaced vertical relation thereto, said carriage member having a cradle-like supporting structure adapted to be passed over said tracks and between and through said cutting knives, said cradle-like structure having means for receiving a block of material containing a plurality of longitudinally spaced and radially extending handle members projecting therefrom which is to be cut simultaneously into a plurality of individual pieces each containing a handle member when the same is passed between said knives.

9. Apparatus of the class described comprising a supporting structure having a slotted table mounted thereon, reciprocating knife carrying frames carrying a plurality of alternately spaced reciprocating cutting knives which operate through the slot in said table, means for reciprocating said knife carrying frames, and, in combination therewith, spaced tracks mounted on said table top and extending through said knife carrying frames having a movable carriage member slidably mounted thereon, stops secured to said tracks for limiting the movement of said carriage member, said carriage member having a cradle-like supporting structure of a slotted construction which is adapted to be passed between and through said cutting knives, said cradle-like structure having means for receiving a block of material containing a plurality of longitudinally spaced handle members projecting therefrom in a single plane which is to be cut simultaneously into a plurality of individual pieces each containing a handle member when the same is passed between said knives, means spaced from said supporting structure for maintaining said handle members in a predetermined position, means for supporting a portable carrier member in alignment with said projecting handle members, and means for moving said carriage member over said tracks.

10. Apparatus of the class described comprising a supporting structure having a slotted table mounted thereon, reciprocating knife carrying frames carrying a plurality of alternately spaced reciprocating cutting knives which operate through the slot in said table, means for reciprocating said knife carrying frames, and, in combination therewith, spaced tracks mounted on said table top and extending through said knife carrying frames having a reciprocating carriage member slidably mounted thereon, stops secured to said tracks for limiting the movement of said carriage member, said carriage member having a cradle-like supporting structure consisting of a plurality of spaced fingers adapted to be passed between and through said cutting knives, said cradle-like structure having a recess therein for receiving a block of material containing a plurality of longitudinally spaced handle members projecting therefrom in alignment which is to be cut simultaneously into a plurality of individual pieces each containing a handle member when the same is passed between said knives, means mounted on said cradle-like structure for engaging certain of said projecting handle members and supporting them in a predetermined plane, means mounted on the opposite end of said carriage member and on the opposite side of said cutting knives for supporting a portable carrier in the same predetermined plane, and means mounted adjacent an end of the carriage member for moving the same back and forth along said tracks.

WILLIAM J. TAYLOR.
CARROLL A. HENNESSY.